United States Patent [19]

Knutson

[11] Patent Number: 4,946,009
[45] Date of Patent: Aug. 7, 1990

[54] ELECTROMAGNETIC VALVE UTILIZING A PERMANENT MAGNET

[75] Inventor: Dale A. Knutson, Nashotah, Wis.

[73] Assignee: Applied Power, Inc., Milwaukee, Wis.

[21] Appl. No.: 337,180

[22] Filed: Apr. 12, 1989

[51] Int. Cl.⁵ .............................................. F16F 9/46
[52] U.S. Cl. .................................. 188/299; 188/282; 251/129.05
[58] Field of Search ................... 188/299, 322.15, 282, 188/290, 319; 251/129.05, 129.08, 129.15, 129.17, 129.19; 137/487.5

[56] References Cited

U.S. PATENT DOCUMENTS

| | | | |
|---|---|---|---|
| 3,740,594 | 6/1973 | Casey | 310/30 |
| 3,809,123 | 5/1974 | Heimann | 251/129.05 |
| 4,127,835 | 11/1978 | Knutson | 335/266 |
| 4,605,197 | 8/1986 | Casey et al. | 251/30.01 |
| 4,682,675 | 7/1987 | Eddy, Jr. | 188/299 |
| 4,749,069 | 4/1988 | Knecht et al. | 251/129.05 X |
| 4,774,976 | 10/1988 | Janecke et al. | 251/129.08 X |
| 4,794,890 | 1/1989 | Richoson, Jr. | 123/90.11 |
| 4,854,429 | 8/1989 | Casey | 188/299 |

FOREIGN PATENT DOCUMENTS 2190461 11/1987 United Kingdom ................ 188/299

Primary Examiner—Douglas C. Butler
Assistant Examiner—Matthew C. Graham
Attorney, Agent, or Firm—Quarles & Brady

[57] ABSTRACT

A valve has a magnetic drive unit axially spaced from a valve section. An axially movable armature is moved by an electromagnet and an annular permanent magnet having radial magnetization. Reciprocation of the armature opens and closes a poppet valve to regulate fluid flow between two chambers. The magnetic characteristics of the magnetic drive unit are such that the armature remains in either of two axial limit positions when current is not being applied to the electromagnetic coils. In order to compensate for fluid flow forces tending to close the poppet when open, a biasing spring is also used to help overcome these forces. In an embodiment applied to vehicle shock absorbers, an orifice plate and disc springs are used adjacent the poppet structure to permit damping characteristics which vary depending on whether the piston or the shock absorber is compressing or rebounding.

12 Claims, 4 Drawing Sheets

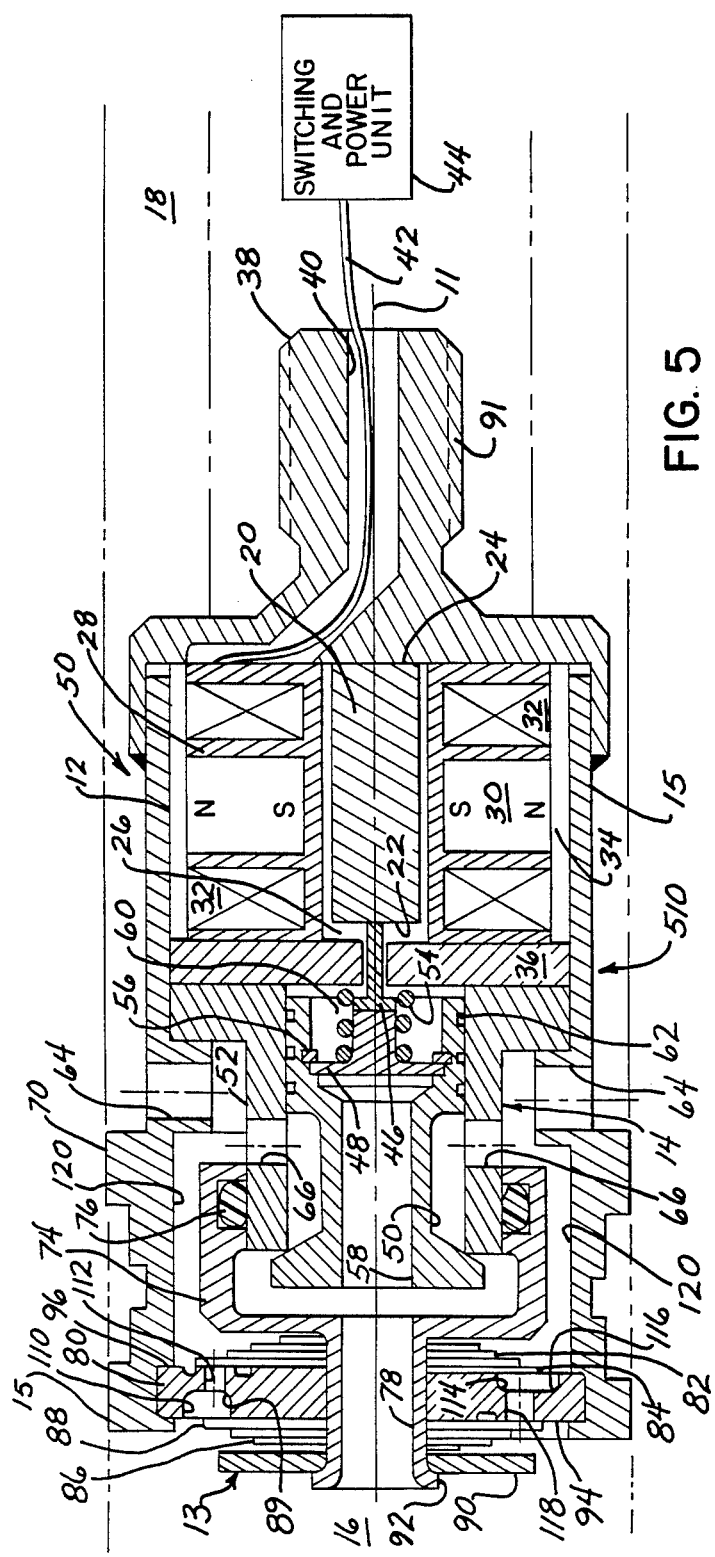
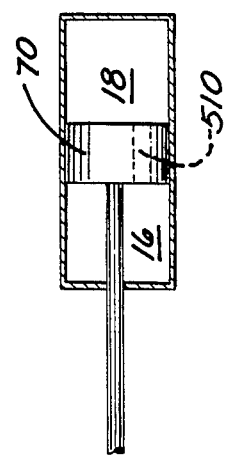
FIG. 5
FIG. 4

ELECTROMAGNETIC VALVE UTILIZING A PERMANENT MAGNET

BACKGROUND OF THE INVENTION

1. Field of the Invention

The present invention relates generally to electromagnetic modulating valves. More particularly, the present invention relates to valves utilizing permanent magnets and electromagnets to provide enhanced response times. Even more particularly, the present invention relates to a modulating electromagnetic valve which may be used in a vehicle shock absorber to vary the damping characteristics of the shock absorber.

2. Description of Related Areas of Art

U.S. Pat. No. 4,605,197 issued on Aug. 12, 1986 to Casey, et al for "Proportional And Latching Pressure Control Device" shows a proportional pressure control device which includes a motor having a housing and reciprocably movable armature which move between first and second limit positions. A poppet valve member is attached to one end of the armature adjacent a valve seat. Centering springs maintain the armature in a centered position with the poppet at a given distance from the valve seat. The fluid flow is controlled proportionally to the current induced in an electromagnetic coil element. Although several elements of this device are similar to the present invention, it is a proportional pressure control device, the length of armature stroke being proportional to the amount of electrical current being used. Dissimilarly, applicant's pulse-width modulated device always moves to each limit position in a cyclical fashion, the frequency of the movement determining the flow rate.

U.S. Pat. No. 4,794,890 issued to Richoson, Jr. on Jan. 3, 1989 for "Electromagnetic Valve Actuator" shows a bistable electromechanical transducer having a reciprocable armature which utilizes a permanent magnet latching arrangement. The permanent magnet latches the armature in each of its two limit positions and an electromagnet moves the armature between the two limit positions. The device further includes an arrangement for decelerating the armature and valve as the valve nears a limit position.

U.S. Pat. No. 4,127,835 issued to Knutson on Nov. 28, 1978 for "Electromechanical Force Motor" shows an electromechanical force motor which has an elongate magnetic casing housing a magnetic armature. The annular electromagnetic coil surrounds the armature and is axially positioned between a pair of permanent magnets having axially directed poles. Like the Casey, et al device, centering springs are used. Furthermore, unlike the present invention, permanent magnetic poles are axially directed as opposed to being radially directed.

U.S. Pat. No. 3,740,594 issued to Casey on June 19, 1973 for "Permanent-Electromagnetic Reciprocating Device" has a tubular, radially magnetized permanent magnet coaxially surrounding a long length armature. The permanent magnet and armature are closely spaced, having an electromagnetic coil in the gap therebetween.

OBJECTS AND SUMMARY OF THE INVENTION

It is an object of the present invention to provide a pulse-width modulated electromagnetic valve which utilizes both a permanent magnet and electromagnet to attain high response times.

It is a further object of the present invention to provide a high response, pulse-width modulated electromagnetic valve which can incorporate check valve apparatus to be used in a vehicle shock absorber to permit varying damping characteristics depending on the travel direction of the piston of the shock absorber.

How these and other objects of the present invention are accomplished will be more fully explained in a detailed description of preferred embodiment taken in conjunction with the FIGURES. However, the objects are generally accomplished in a valve having a magnetic drive unit axially spaced from a valve section. An axially movable armature is moved by an annular electromagnet and an annular permanent magnet having a radial magnetization. Reciprocation of the armature opens and closes a poppet valve to regulate fluid flow between two chambers. The magnetic characteristics of the magnetic drive unit are such that the armature remains in either of two axial limit positions when current is not being applied to the electromagnetic coils. In order to compensate for fluid flow forces tending to close the poppet when open, a biasing spring is also used to help overcome these forces.

In an embodiment applied to vehicle shock absorbers an orifice plate and disk springs are used adjacent the poppet structure to permit damping characteristics which vary depending on whether the piston of the shock absorber is compressing or rebounding.

Other variations and modifications, as well as different applications of the invention, will become apparent to those skilled in the art after reading the specification and are deemed to fall within the scope of the present invention if they fall within the scope of the claims which follow the description of the preferred embodiments.

DESCRIPTION OF DRAWINGS

FIG. 1A is a cross-sectional view of the valve taken along the line 1A–1A of FIG. 1.

FIG. 4 is a central sectional view of a vehicle shock absorber using a second embodiment of the present invention.

FIG. 5 is a central sectional view of the valve of FIG. 4.

In the FIGS., like reference numerals refer to like components.

DESCRIPTION OF THE PREFERRED EMBODIMENTS

General Configuration

Figure 1:
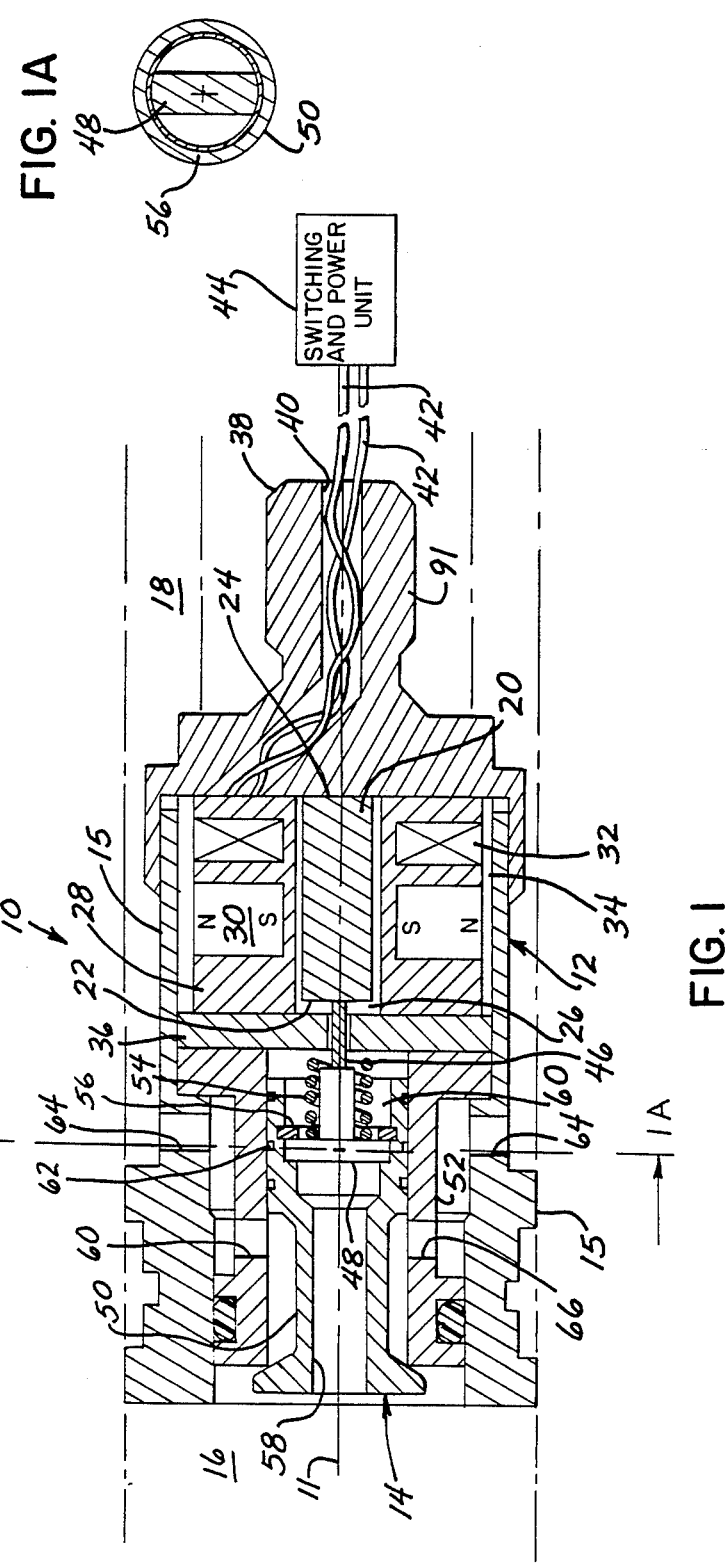
FIG. 1 is a central-sectional view of the valve of the present invention.

The preferred embodiment of the present invention is shown in FIG. 1. An electrohydraulic valve 10 has a magnetic drive unit 12 and a hydraulic valving section 14 held together by a valve sleeve 15. Valve 10 adjustably regulates fluid flow between a first chamber 16 and a second chamber 18.

Magnetic drive unit 12 has a generally cylindrical armature 20 having a first face 22 and a second face 24. Valve 10 is depicted in FIG. 1 as having a central axis 11. Armature 20 is axially movable within a cylindrical chamber 26 and is preferably made of a low magnetic reluctance, ferromagnetic material such as iron. Armature is held in place radially by a low friction, high magnetic reluctance element 28 made of a material such as teflon.

Held in a fixed position by element 28 is an annular permanent magnet 30 and coil 32. Permanent magnet 30 has a radial magnetization as noted by the poles "N" and "S". Axially adjacent magnet 30 is coil 32, magnet 30 and coil 32 being concentric with armature 20. Element 28, magnet 30 and coil 32 are all held in fixed relation by a sleeve 34 made of low magnetic reluctance material.

The leftward travel of the first face 22 of armature 20 is limited by separator plate 36. Plate 36 is circular and concentric with axis 11. The rightward travel of second face 24 of armature 20 is limited by cap 38 which has a channel 40 extending therethrough. Channel 40 provides access for wires 42 to coil 32 to connect it to a switching and power unit 44. Unit 44 controls timing and polarity of current sent to coil 32. Cap 38 is secured by appropriate means to valve sleeve 15.

Figure 2:
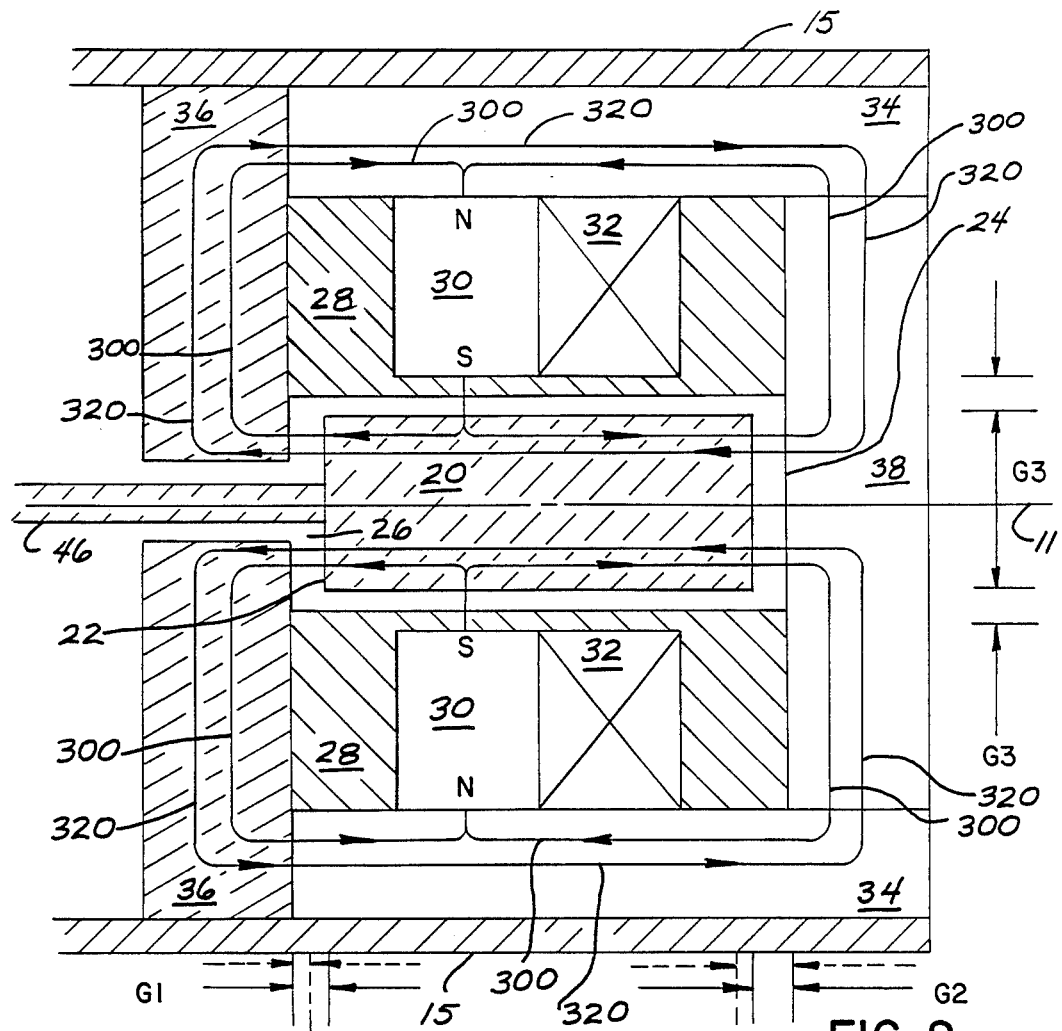
FIG. 2 is a magnetic circuit schematic of the valve of FIG. 1.

The magnetic characteristics of the above-described magnetic drive unit 12 are illustrated in FIG. 2. In the configuration of FIG. 1, armature 20, separator plate 36, cap 38, sleeve 34 and sleeve 15 all are made of low magnetic reluctance material which, as seen in FIG. 2, assists in establishing the illustrated magnetic circuit.

FIG. 2 illustrates the magnetic characteristics of the drive unit 12 when the armature 20 is to open the valve (i.e. to move armature 20 from right to left in FIG. 1). By applying current in the proper direction to coil 32 a magnetic field with flux lines 320 oriented as shown is induced. A pre-existing field due to permanent magnet 30 is oriented as shown by magnetic flux lines 300. The aggregate force on armature 20 is dependent upon the flux densities of the fields through gaps G1, G2 and G3.

Gap G3, radially measured between the armature 20 and the magnetic components 30, 32, remains constant. Gap G1 is measured between plate 36 and armature face 22, and varies depending on the position of face 22. Likewise gap G2 varies depending on the position of face 24. The sum of gaps G1 and G2 remains constant with the size of gap G1 increasing as gap G2 shrinks, and vice versa. It should be noted that upon reversing the direction of the current flow, the direction of flux lines 320 will be reversed.

The valve section 14 is separated from the magnetic drive unit 12 by separator plate 36. Connecting rod 46 joins armature 20 and poppet bracket 48. Bracket 48 is locked into poppet 50 so that poppet 50 moves with armature 20. Poppet 50 moves axially movable within inner sleeve 52 which is radially inside of sleeve 15.

When poppet 50 is open, flow forces due to fluid flowing between poppet 50 and sleeve 52 tend to force the valve closed. To counter these flow forces, spring 54 is used to keep the valve open despite the flow forces. Spring 54 is held in place by a snap ring 56 and separator plate 36.

As seen in FIG. 1A, bracket 48 is configured to permit free flow of fluid between the central bore 58 of poppet 50 and chamber 60 between plate 36 and bracket 48. High speed reciprocal movement of poppet 50 is also aided by a number of peripheral pressure balancing grooves 62 on poppet 50. When poppet 50 is in its open position, fluid flows from chamber 16 through sleeves 52 and 15 and into chamber 18. Ports 64 and 66 are provided in sleeves 15 and 52, respectively, to establish this fluid passage.

Operation

During the forthcoming description of the operation of valve 10, reference will be made to FIG. 3 which illustrates various operational characteristics of the valve. When referring to points on the force curves of FIG. 3, such points will be referred to as forces.

Figure 3:
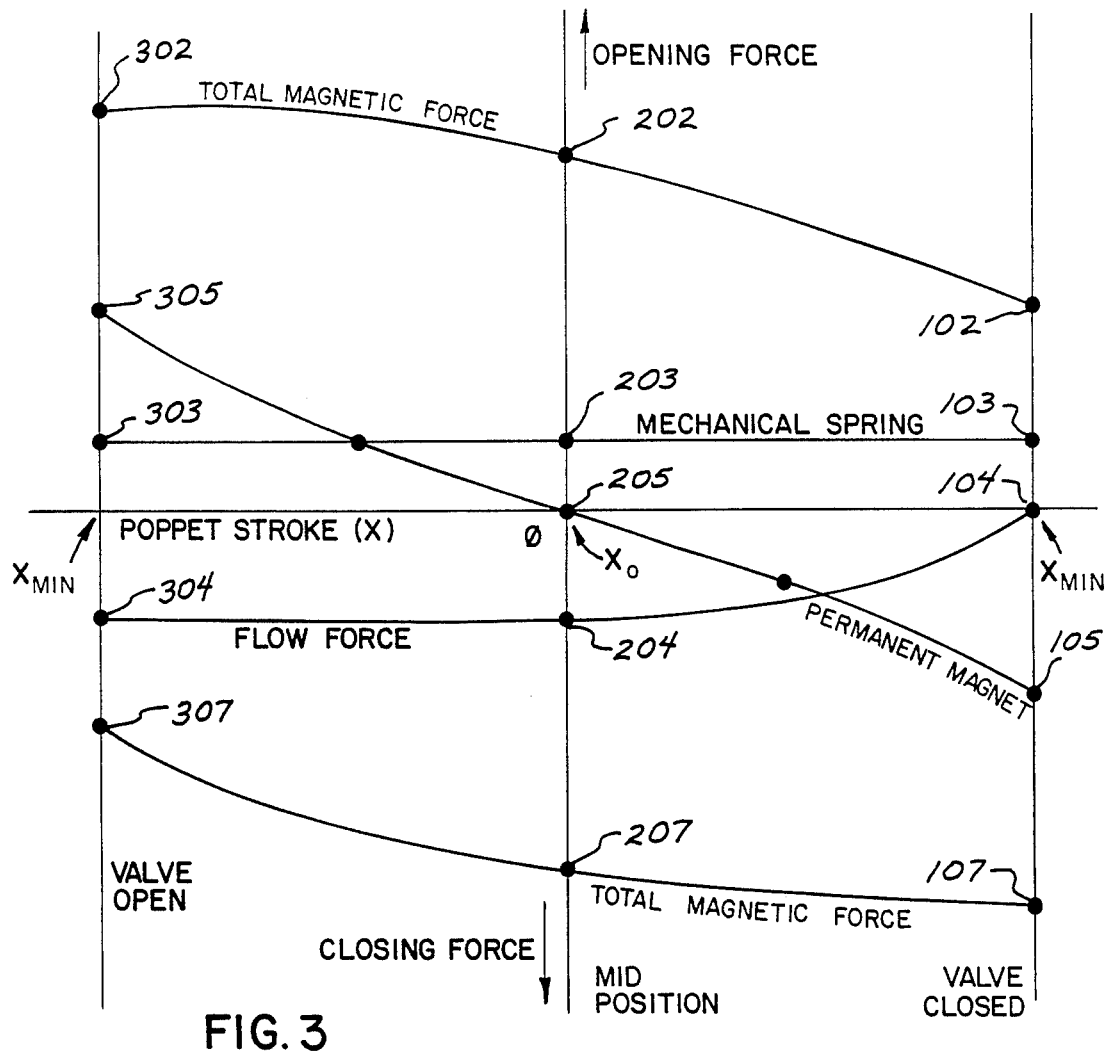
FIG. 3 is a graph illustrating opening and closing forces in the valve.

In FIG. 3, the vertical axis represents opening and closing forces - points above the horizontal axis being forces tending to open the valve and points below being forces tending to close the valve. Additionally, the horizontal axis defines poppet stroke with the valve's fully open position (i.e. G1=0) at $x_{min}$ and fully closed position (i.e. G2=0) at $x_{max}$. Each force curve is labelled with the valve component or phenomena inducing the defined force.

Unlike proportional pressure control devices, the valve 10 has no centering springs or the attendant forces to overcome. When current is turned off in coil 32, the armature 20 is in one of the limit positions (open or closed). When valve 10 is closed and no current is flowing in coil 32, forces 101, 103, 104 and 105 add to yield a net force holding armature 20 (and poppet 50) in a closed position.

It should be noted here that gap G3 is included in the magnetic circuit to prevent the total circuit reluctance from going to zero when G1=0 or G2=0. As graphically depicted in FIG. 3, this avoids nonlinear tails at the end of the stroke. Thus, the flux density-induced force to hold the armature 20 at either stroke end is adequate, though not excessive. Armature 20 is driven into magnetic saturation at the ends of its stroke. This prevents the creation of excessive magnetic fields which would otherwise have to be collapsed before any armature motion could begin.

When the coil 32 is switched on (with current in the correct direction) an opening force is generated by the combination of the permanent magnet 30 and the coil 32 (102). Forces 102 and 103 combine to begin opening poppet 50. The mechanical spring force remains generally constant during the armature stroke, though it increases slightly as the valve opens.

The flow force 204 always tends to try to close the valve. Despite force 205 from permanent magnet 30 being zero at mid stroke, coil 32 and spring 54 proved sufficient forces 202, 203, respectively, to keep opening the valve.

Once armature 20 has reached the "open" end of its stroke (at $X_{min}$), mechanical spring 54 and permanent magnet 30 exert forces 303, 305 to maintain the valve in an open position. Current may then be switched off and armature 20 and poppet 50 maintain their open positions.

To close the valve, current is reapplied, with polarity reversed, generating force 307. Force 307 combines with flow force 304 to overcome mechanical spring force 303 to begin the valve's closing. At $x_o$ the total magnetic force 207 (coil force alone since the permanent magnet exerts no motive force 205 at $x_o$) plus flow force 204 continue to close the valve despite the force 203 from spring 54.

Finally, when armature 20 has reached $X_{max}$, coil 32 is again switched off, leaving the force 105 of permanent magnet 30 to hold poppet 50 closed over the opening force 103 of spring 54. The valve is then ready to begin another cycle of operation.

The above-described valve configuration provides high speed operation in a modulating valve without the difficulties typically encountered. The design minimizes or eliminates many of the forces that typically must be overcome by the electromagnetic motive forces. For example, no centering spring forces are encountered.

Shock Absorber Application

FIG. 4 shows a valve 510 in a shock absorber piston 70 travelling axially in a cylinder 72. Valve 510 preferably permits different force velocity behavior of the piston 70 during compression compared to the force/velocity behavior during rebound. In order to accomplish this, a bidirectional check valve section 13 is added.

FIG. 5 shows the adapted valve 510 having many of the same components as valve 10 of FIG. 1. Section 13 provides the desired bidirectionally variable damping. Section 13 is attached to inner sleeve 52 by a generally cylindrical cup sleeve 74 and O-ring 76. Sleeve 74 has a narrow passage 78 which permits fluid to flow from chamber 16 to poppet 50.

Passage 78 also acts as a hub for an orifice plate 80 which is held in place by sleeve 15. Plate 80 is sandwiched between a first disk spring assembly 82 (having a large disk spring 84) and a second disk assembly 86 (having a large disk spring 88). Plate 80 and assemblies 82, 86 are held securely on sleeve 74 by locking ring 90 which is held in place by lip 92 of passage 78.

Plate 80 has a first face 94 and a second face 96. One orifice 98 has a large inlet hole 110 in face 94 and a small outlet hole 112 in face 96 covered by disk spring 84. Similarly, orifice 114 has a large inlet hole 116 in face 96 and a small outlet hole 118 in face 94 covered by disk spring 88. Orifice 98 permits unidirectional flow from chamber 16 to chamber 18 via channel 120 and ports 64. Orifice 114 similarly only allows fluid flow in the opposite direction.

The configuration of section 13 means that valve 510 provides threshold damping that may be enhanced by operating the valve 510 in a desired manner. Orifice 98 and disk spring 84 act as a check valve as do orifice 104 and spring 88. The specific characteristics of the check valves are determined by the orifice dimensions and spring constants of the disk spring assemblies 82, 86.

By modulating the poppet 50, a wide range of damping settings can be achieved. This operation is accomplished in a highly compact, fast-acting valve.

In FIG. 5, the coil (32) is split into two windings to equalize the magnetic flux leakage at G1 and G2, thus resulting in a more symmetrical design with respect to force.

Alternate Embodiments

Figure 6:
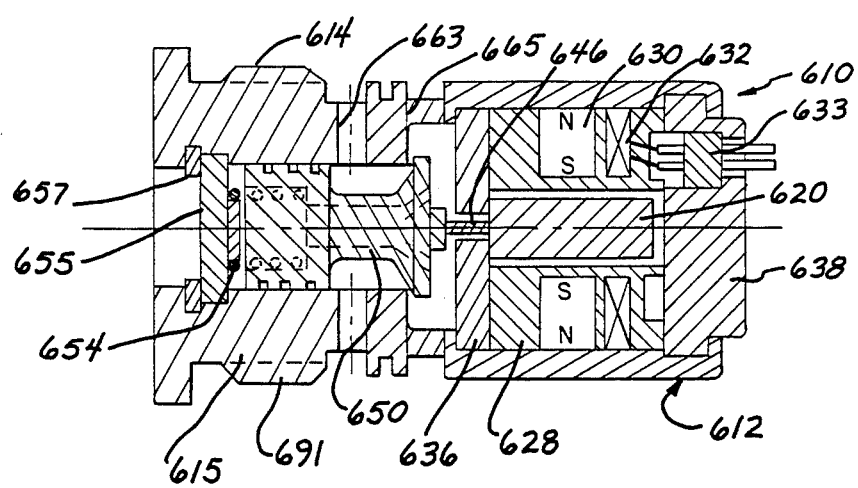
FIG. 6 is a central sectional view of a third embodiment of the present invention.
Figure 7:
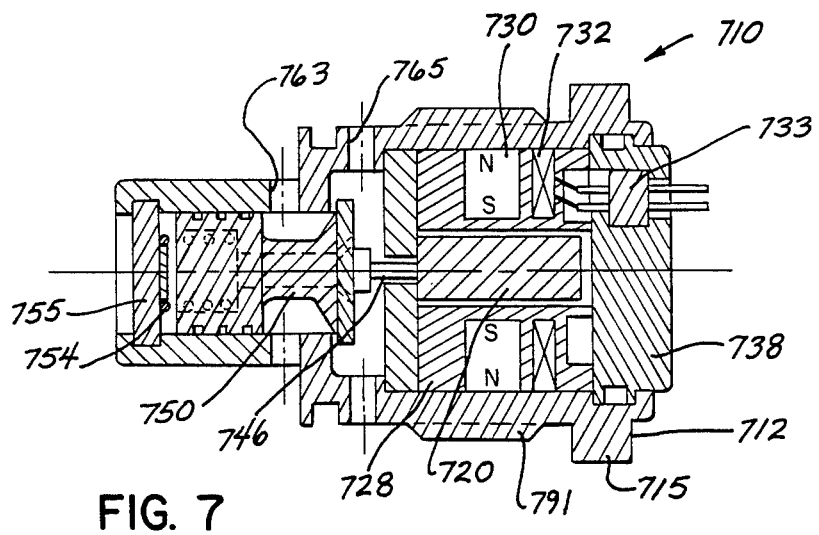
FIG. 7 is a central sectional view of a fourth embodiment of the present invention.

FIGS. 6 and 7 show alternate embodiments of the present invention using different poppet configurations, inlet and outlet ports, and external mountings.

In FIG. 6, valve 610 has a magnetic drive section 612 in which armature 620 reciprocates between cap 638 and plate 636. Armature 620 is driven by permanent magnet 630 and coil 632 (coupled to connector 633) which are held in place by element 628.

Connector rod 646 secures armature 620 to poppet 650 which controls fluid communication between ports 663 and 665. Poppet 650 is biased toward its open position by spring 654 which is held in housing 615 by plug 655 and snap ring 657. Valve 610 is secured to the device in which it is being used by threading 691 located adjacent valving section 614. In FIGS. 1 and 5, the valves are secured by threading 91 at the tip of cap 38.

In the embodiment illustrated as valve 710 in FIG. 7, drive unit 712 again has an armature 720 driven by magnet 730 and coil 732 (coupled to connector 733) which are held in place by element 728. Rod 746 connects armature 720 to poppet 750 which is biased toward open by spring 754. Housing 715 has ports 763, 765, communication between which is controlled by the position of poppet 750. Plug 755 holds spring 754 in place. Threading 791 near end cap 738 holds valve 710 in the device being used.

Other variations, modifications and applications will become apparent to those skilled in the art. In particular, a number of other applications of the valve are possible. Therefore, the above description of the preferred embodiments is to be viewed as illustrative rather than limiting. The scope of the present invention is limited only by the scope of the following claims.

What is claimed is:

1. A pulse-width modulated valve for regulating fluid flow between first and second chambers, said valve comprising:
    (a) a generally cylindrical housing holding magnetic drive means connected to regulator means by connector means;
    (b) said magnetic drive means comprising:
        (1) a cylindrical ferromagnetic armature axially reciprocable between first and second positions;
        (2) magnetic motive means, generally surrounding said armature, comprising a radially magnetized permanent magnet and electromagnet means, said motive means designed to move said armature alternately between said first and second limit positions and to hold said armature at one of said limit positions in a preselected fashion; and
        (3) means for controlling said motive means; and
    (c) said regulator means comprising:
        (1) a generally cylindrical poppet, connected to said armature by said connector means, and axially reciprocable in a sleeve between a first open position when said armature is in said first limit position and a second closed position when said armature is in said second limit position;
        (2) wherein when said poppet is in said closed position, said poppet and said sleeve prevent fluid flow between said chambers, and when said poppet is in said open position, said poppet and said sleeve permit fluid flow between said chambers; and
        (3) means for biasing said poppet toward said open position.

2. The valve of claim 1 wherein said electromagnet means comprises a coil, surrounding said armature, and activatable to direct magnetic motive forces to urge said armature selectively to said first or second position.

3. The valve of claim 2 wherein said control means comprises means for supplying electrical current to said coil and means for switching current direction to induce magnetic fields of preselected directions and intensities in said armature.

4. The valve of claim 3 wherein said connector means comprises a bracket mounted to said poppet and a rod rigidly connecting said bracket to said armature.

5. The valve of claim 4 wherein said biasing means is a spring.

6. The valve of claim 1 further comprising check valve means adjacent said regulator means, said check valve means allowing fluid to flow at a first rate from said first chamber to said second chamber and a second rate from said second chamber to said first chamber.

7. The valve of claim 6 wherein said check valve means comprises:
   a plate having a first orifice and a second orifice;
   first metering means adjacent said first orifice and second metering means adjacent said second orifice.

8. The valve of claim 7 wherein said first metering means comprises a first plurality of disk springs and said second metering means comprises a second plurality of disk spring.

9. The valve of claim 8 wherein said first and second chambers are the compression and rebound chambers, respectively, of a shock absorber.

10. A pulse width modulated valve for regulating fluid flow between first and second chambers, said valve comprising:
    (a) a generally cylindrical housing holding magnetic drive means connected by connector means to regulating means;
    (b) said drive means comprising:
       (1) a cylindrical ferromagnetic armature concentric with said housing and reciprocable between first and second limit positions;
       (2) annular magnet means surrounding said armature for reciprocating said armature between said first and second limit positions, said magnet means comprising a radially magnetized permanent magnet approximately axially equidistant from said first and second limit positions, and a coil surrounding said armature for producing magnetic fields in said armature, parallel to the axis of said armature and in a preselected direction and intensity;
       (3) means for supplying electrical current to said coil in a predetermined fashion;
    (c) said regulating means comprising:
       (1) a cylindrical poppet rigidly secured to said armature by said connector means and axially movable in a sleeve between a first open position when said armature is in said first limit position and a second closed position when said armature is in said second limit position;
       (2) a first fluid passage, through said sleeve and said housing, between said first and second chambers; wherein said first passage is closed when said poppet is in said closed position and said first passage is open when said poppet in said open position; and
    (d) means for biasing said poppet toward said open position.

11. The valve of claim 10 further comprising check valve means comprising:
    a cylindrical conduit axially spaced from said poppet and concentric therewith; a circular plate mounted concentrically with said conduit, said plate having first and second faces and first and second orifices; a second fluid passage connecting said second face to said second chamber; first disk spring means mounted to said first face and second disk spring means mounted to said second face;
    wherein said first orifice is configured to permit fluid to flow at a first flow rate from said first chamber to said second fluid passage and to prevent fluid from flowing from said second fluid passage to said first chamber; and wherein said second orifice is configured to permit fluid to flow at a second flow rate from said second fluid passage to said first chamber and to prevent fluid from flowing from said first chamber to said second fluid passage; and
    wherein said first flow rate is determined by said first disk spring means and said second flow rate is determined by said second disk spring means.

12. The valve of claim 11 wherein said first and second chambers are the rebound and compression chambers, respectively, of a shock absorber.

* * * * *